Patented Aug. 21, 1945

2,383,206

UNITED STATES PATENT OFFICE 2,383,206

TREATMENT OF HYDROCARBONS

William J. Mattox, Riverside, Ill., assignor to Universal Oil Products Company, Chicago, Ill., a corporation of Delaware No Drawing. Application September 30, 1943, Serial No. 504,458

9 Claims. (Cl. 260—683)

This invention relates to the catalytic treatment of unsaturated hydrocarbons and particularly to the catalytic conversion of olefinic hydrocarbons. By this process normally liquid olefins with straight or branched chain structures may be converted into substantial yields of normally gaseous olefins comprising essentially propylene and butylenes. The present application is a continuation-in-part of my earlier application Serial No. 470,239, now Patent No. 2,340,007, which is in turn a continuation-in-part of application Serial No. 331,934, filed April 27, 1940.

With the rapid development of hydrocarbon technology for producing gasolines of high antiknock value by alkylation of low boiling isoparaffins with olefins, it has become necessary to obtain relatively large amounts of normally gaseous olefins including propylene and butylenes. Frequently, normally liquid olefins are more readily available than the more desirable normally gaseous olefins and accordingly it sometimes becomes highly desirable to convert normally liquid olefins into normally gaseous olefins, particularly propylene and the butylenes. The present invention involves the conversion of normally liquid olefinic hydrocarbons in the presence of a specific type of catalytic material which functions under suitable conditions of operation to catalyze the formation of relatively high yields of normally gaseous olefins, particularly propylene and butylenes.

Many catalysts such as reduced metals and particularly reduced iron and nickel when employed in hydrocarbon conversions generally accelerate reactions leading to the formation of gas, and these catalysts also have the disadvantage of being poisoned readily and of being coated quickly with carbonaceous and hydrocarbonaceous deposits. Many metal oxide catalysts which are available accelerate principally hydrogenation reactions. The preferred catalyst in the present process is characterized, however, by its selectivity in accelerating the formation of propylene and butylenes from normally liquid olefins, its ease and simplicity of manufacture, its reproducibility, and its refractory nature, the latter property enabling it to retain its catalytic properties over extended periods of time during use and reactivation, both operations being carried out at relatively high temperatures.

One specific embodiment of the present invention relates to a process for converting normally liquid olefinic hydrocarbons into substantial yields of normally gaseous olefinic hydrocarbons including propylene and butylenes which comprises subjecting said normally liquid olefinic hydrocarbons to cracking conditions in the presence of a catalyst composite comprising essentially anhydrous aluminum sulfate and silica.

I have found that a composite of aluminum sulfate and silica is effective as a catalyst in the conversion of normally liquid olefins into relatively high yields of normally gaseous olefins including propylene and butylenes. The proportions of silica and aluminum sulfate may be varied in order to produce catalysts of different activities. However, experimental results have shown definitely that the composite catalyst is unexpectedly superior in activity to either of the constituents employed separately as will be shown in a later example.

The different normally liquid olefinic hydrocarbons are not necessarily equivalent in their ease of cracking to produce relatively high yields of propylene and butylenes and accordingly a higher temperature and/or a longer time of contact with the catalyst is generally required when treating the less reactive olefinic hydrocarbons, such as the pentenes, than may be utilized for treating more reactive olefins, such as the heptenes, octenes, and other olefins containing more than five carbon atoms per molecule.

In accordance with the present invention, composites of substantially anhydrous aluminum sulfate and silica, generally in the form of small pellets or granules, may be utilized as filling material for catalytic reactors through which normally liquid olefins or hydrocarbon fractions containing a relatively high proportion of normally liquid olefins may be passed to form a product containing relatively high amounts of propylene and butylenes. The catalyst may be utilized not only in the form of pellets of uniform size and of cylindrical shape but also as particles of irregular size and shapes produced by grinding, consolidating, and sizing of the relatively dry silica and aluminum sulfate. The catalyst may also be employed as a powder which my be mixed with normally liquid olefin-containing hydrocarbons or their vapors and passed through suitable reactors to effect conversion.

While the simple procedure of preheating the vapors of the normally liquid olefinic hydrocarbons to a temperature suitable for conversion in contact with the catalyst, and then passing the vapors over a stationary bed or layer of catalyst particles, may be employed in some cases, it may be preferable to pass the preheated vapors through or around a plurality of tubes of relatively small diameter connected in series or in parallel and having the catalyst disposed within or around said tubes since such arrangements of apparatus are well adapted to permit heating and cooling of the catalyst and thus to compensate for heat lost and/or absorbed in the conversion reactions and to dissipate heat liberated during reactivation treatments.

Such reactivation of the catalyst may be carried out rapidly by passing air or other oxygen-containing gas over the used catalyst particles to burn off deposits of carbonaceous or hydrocarbonaceous material at approximately a conversion temperature without affecting appreciably the catalytic activity. After the passage of the hydrocarbon vapors over the catalyst, the products may be separated, generally by fractionation or by other suitable means and the insufficiently converted material may be returned to further catalytic treatment.

The preferred temperature at which normally liquid olefinic hydrocarbons may be contacted with a composite of aluminum sulfate and silica to produce substantial yields of normally gaseous olefins, particularly propylene and butylenes, is from about 200° to about 500° C. and under a pressure of from about 0.1 atmosphere absolute to a moderately superatmospheric pressure, but generally not in excess of about 35 atmospheres. Under these conditions a major proportion of the normally liquid olefinic hydrocarbons charged to the process may be converted into propylene and butylenes, the latter containing relatively high proportions of isobutylene.

The rate at which the normally liquid olefinic hydrocarbon is passed over the catalyst or otherwise contacted therewith may vary from about 0.1 to about 10 volumes of liquid charge per hour per volume of catalyst space. Continuous operation may be accomplished with relatively little decrease in catalyst activity, but after a time, depending upon the nature of the charge, the conditions of operation, etc., it may be advantageous to remove adsorbed or deposited carbonaceous or hydrocarbonaceous materials by oxidation in air or in another oxygen-containing gas in order to restore to the catalyst a substantial proportion of its original activity.

The following example is given to illustrate the invention, but without any intention of unduly limiting its generally broad scope.

A catalyst comprising 64 weight per cent silica and 36 weight per cent aluminum sulfate was prepared as follows:

200 grams of silica gel containing 52.3 per cent $SiO_2$ and ground to pass through a 30 mesh sieve was thoroughly mixed with 115.6 grams of $Al_2(SO_4)_3 \cdot 18H_2O$ of similar mesh and the mixture heated in an oven at 300° C. for three hours. Rosin amounting to 4 weight per cent of the heated mixture was added and the catalyst formed into 1/8" x 1/8" pellets. The catalyst was dried and the rosin removed by calcining in a stream of air at an initial temperature of 100° C. which was increased during four hours to 550° C. The absence of $CO_2$ in the exit gases showed complete removal of the rosin.

A normal heptene-containing fraction (89% $C_7H_{14}$) was passed at 400° C., atmospheric pressure, and a liquid hourly space velocity of 1 (1 liquid volume of charge per volume of catalyst per hour) over the above prepared catalyst and over each of the individual components thereof. The results obtained are tabulated below.

| Catalyst | 100% silica | 64% Silica—36% $Al_2(SO_4)_3$[1] | 100% $Al_2(SO_4)_3$ |
|---|---|---|---|
| Yields, wt. percent of charge: | | | |
| Total hydrocarbon | 100.0 | 95.6 | 98.8 |
| Condensed gases | 0.0 | 31.2 | 0.0 |
| $C_5$ | 0.0 | [2] 7.3 | |
| $C_6$ | 0.0 | [3] 5.9 | 2.0 |
| $C_7$ | 100.0 | 51.2 | 96.8 |
| Gas Uncondensed | Trace | 0.9 | 0.0 |
| Carbon | Trace | 2.5 | 1.9 |
| Unaccounted | 0.0 | −1.0 | +0.7 |
| Yields, wt. percent of $C_7H_{14}$ converted: | | | |
| Condensed gas | | 44.2 | |
| Uncondensed gas | | 1.3 | |
| $C_5$ | | 10.3 | |
| $C_6$ | | 8.4 | |
| $C_7$ satd. hcbns.[4] | | 30.9 | |
| Carbon | | 3.5 | |
| Unaccounted | | 1.4 | |
| Analysis of condensed gas, mol percent: | | | |
| $C_2$ | | 0.5 | |
| $C_3H_6$ | | 41.7 | |
| $C_3H_8$ | | 3.2 | |
| i-$C_4H_{10}$ | | 24.1 | |
| i-$C_4H_8$ | | 15.7 | |
| n-$C_4H_8$ | | 13.1 | |
| n-$C_4H_{10}$ | | 1.7 | |

[1] Catalyst after 1 regeneration.
[2] Bromine No. 149; 65% $C_5H_{10}$.
[3] Bromine No. 122; 65% $C_6H_{12}$.
[4] 39% aromatics.

The results given in the above table show that the silica-aluminum sulfate catalyst produced an unexpected result in that relatively high yields of propylene and butylenes were formed from normal heptene at 400° C. whereas substantially no propylene or butylenes were formed at the same temperature when normal heptene was treated with silica alone or aluminum sulfate alone.

I claim as my invention:

1. A process for converting a normally liquid olefinic hydrocarbon into substantial yields of normally gaseous olefinic hydrocarbons including propylene and butylenes which comprises subjecting said normally liquid olefinic hydrocarbon to cracking conditions in the presence of a catalyst composite comprising essentially aluminum sulfate and silica.

2. A process for converting a normally liquid olefinic hydrocarbon into substantial yields of normally gaseous olefinic hydrocarbons including propylene and butylenes which comprises subjecting said normally liquid olefinic hydrocarbon to cracking at a temperature of from about 200° to about 500° C. in the presence of a catalyst composite comprising essentially aluminum sulfate and silica.

3. A process for converting a normally liquid olefinic hydrocarbon into substantial yields of normally gaseous olefinic hydrocarbons including propylene and butylenes which comprises heating said normally liquid olefinic hydrocarbon at a temperature of from about 200° to about 500° C. under an absolute pressure of from about 0.1 to about 35 atmospheres in the presence of a catalyst composite comprising essentially aluminum sulfate and silica.

4. A process for producing substantial yields of propylene and butylenes which comprises cracking an olefinic hydrocarbon containing at least 5 carbon atoms per molecule in the presence of a catalyst composite comprising essentially aluminum sulfate and silica.

5. A process for producing substantial yields of propylene and butylenes which comprises cracking a heptene at a temperature of from about 200° to about 500° C. in the presence of a catalyst composite comprising essentially aluminum sulfate and silica.

6. A process for converting a normally liquid olefinic hydrocarbon into substantial yields of lower boiling olefinic hydrocarbons which comprises subjecting said normally liquid olefinic hydrocarbon to cracking conditions in the presence of a catalyst comprising essentially aluminum sulfate and silica.

7. A process for producing normally gaseous olefins which comprises subjecting a normally liquid straight chain olefin to the action of a catalyst comprising aluminum sulfate and silica at a temperature of from about 200° C. to about 500° C.

8. The process as defined in claim 1 further characterized in that said normally liquid hydrocarbon is a normal olefin.

9. The process as defined in claim 7 further characterized in that said straight chain olefin is normal heptene.

WILLIAM J. MATTOX.